United States Patent [19]

Kalinich

[11] Patent Number: 5,417,317
[45] Date of Patent: May 23, 1995

[54] APPARATUS FOR SEGREGATING AND FEEDING FRUIT FROM A BULK SUPPLY

[75] Inventor: Robert C. Kalinich, Shippensburg, Pa.

[73] Assignee: Atlas Pacific Engineering Company, Pueblo, Colo.

[21] Appl. No.: 235,491

[22] Filed: Apr. 29, 1994

[51] Int. Cl.⁶ ............................................. B65G 47/19
[52] U.S. Cl. .................................. 198/358; 198/367; 198/444; 414/294; 414/296
[58] Field of Search ............... 414/287, 288, 293, 294, 414/295, 296, 304, 300, 327, 325; 198/358, 367, 444; 209/3

[56] References Cited

U.S. PATENT DOCUMENTS

| | | | |
|---|---|---|---|
| 1,861,512 | 7/1932 | Shaw | 414/294 |
| 2,521,998 | 9/1950 | Rottier | 198/358 |
| 2,937,739 | 5/1960 | Levy | 198/367 X |
| 4,844,240 | 7/1989 | Hütter et al. | 198/443 X |

FOREIGN PATENT DOCUMENTS

| | | | |
|---|---|---|---|
| 499246 | 11/1950 | Belgium | 414/296 |
| 1392956 | 5/1975 | United Kingdom | 198/358 |
| 982871 | 12/1982 | U.S.S.R. | 198/358 |

Primary Examiner—Frank E. Werner

[57] ABSTRACT

Apparatus for segregating and feeding fruit onto a conveyor comprising a conveyor device for moving fruit from a bulk supply, a diverter gate movable from a position to one side of the conveyor device to a fruit intercept position, a holding bin having a funnel-shaped bottom surface positioned for receiving fruit diverted from the conveyor device, the bottom surface of the bin extending downward toward a second conveyor having a plurality of fruit receptacles, a sensor positioned for detecting the approximate quantity of fruit within the bin, and a device responsive to the sensor for operating the diverter gate to intercept fruit from the first conveyor when the bin is near to empty.

8 Claims, 6 Drawing Sheets

APPARATUS FOR SEGREGATING AND FEEDING FRUIT FROM A BULK SUPPLY

This invention relates generally to an apparatus for feeding fruit from a bulk supply, singulating pieces of fruit and depositing the fruit onto a conveyor. Contrasted with prior art apparatus having a similar purpose, the present invention provides a dry feed rather than the use of water tanks and reservoirs which require considerable maintenance and problems of water conservation. Such a teaching is made in U.S. Pat. No. 3,704,041.

BRIEF DESCRIPTION OF THE INVENTION

The apparatus herein described particularly relates to the processing of apples from a bulk supply onto a conveyor belt from which they are periodically gated and discharged into a holding bin. The shape of the bin is contoured and sloped to direct the apples to a discharge edge from which they are received upon a second conveyor having a plurality of fruit receptacles equally spaced apart a distance sufficient to receive single pieces of fruit from the bin. An optical sensor is positioned for detecting the approximate quantity of apples within the bin and, when the bin is near to empty, the sensor activates a gate for diverting fruit from the belt conveyor, causing the fruit to discharge into the bin and thus replenishing fruit within the bin. At a time that the sensor again detects fruit the gate is closed and the cycle is repeated.

A principal object of the invention is to provide a "dry" feed apparatus, principally used for apples.

Another object is to provide a unique storage bin from which apples or other fruit may be stored and passed off to a conveyor in a singulating process.

In the drawings forming a part of this application and in which like parts are identified by like reference numerals throughout the same:

Figure 1:
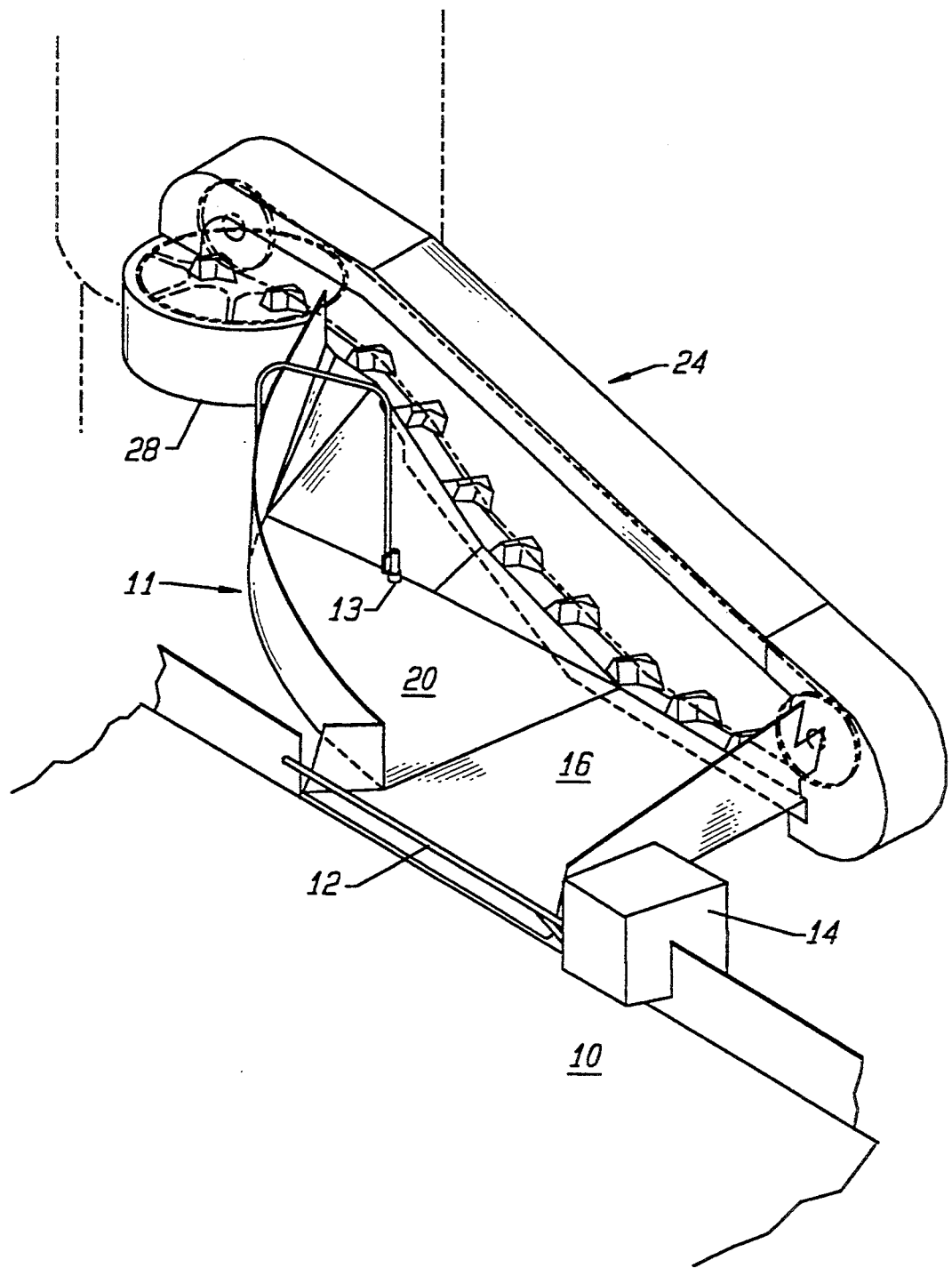
FIG. 1 is a perspective view of a preferred form of the invention described.

Referring to FIG. 1 in particular, there is illustrated a preferred embodiment in an apparatus for singulating and feeding pieces of fruit, such as apples. The fruit pieces are initially carried on a belt conveyor 10, which receives the fruit from a bulk storage container (not shown), and periodically diverted into a bin 11 by a gate 12. The gate is pivotally mounted to one side of conveyor means 10 and is positioned under the control of an optical sensor 13 by a solenoid or other operating means 14. In the position shown in FIGS. 1, 2 and 3, the gate is closed as to bin 11 but opens to its diverting position, as shown in FIG. 4, when the supply of fruit within the bin has been depleted.

Figure 7:
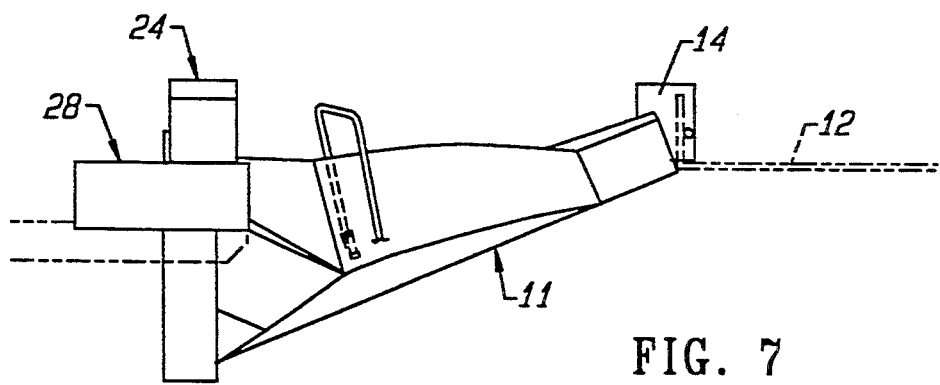
FIG. 7 is an end view of the apparatus.
Figure 8:
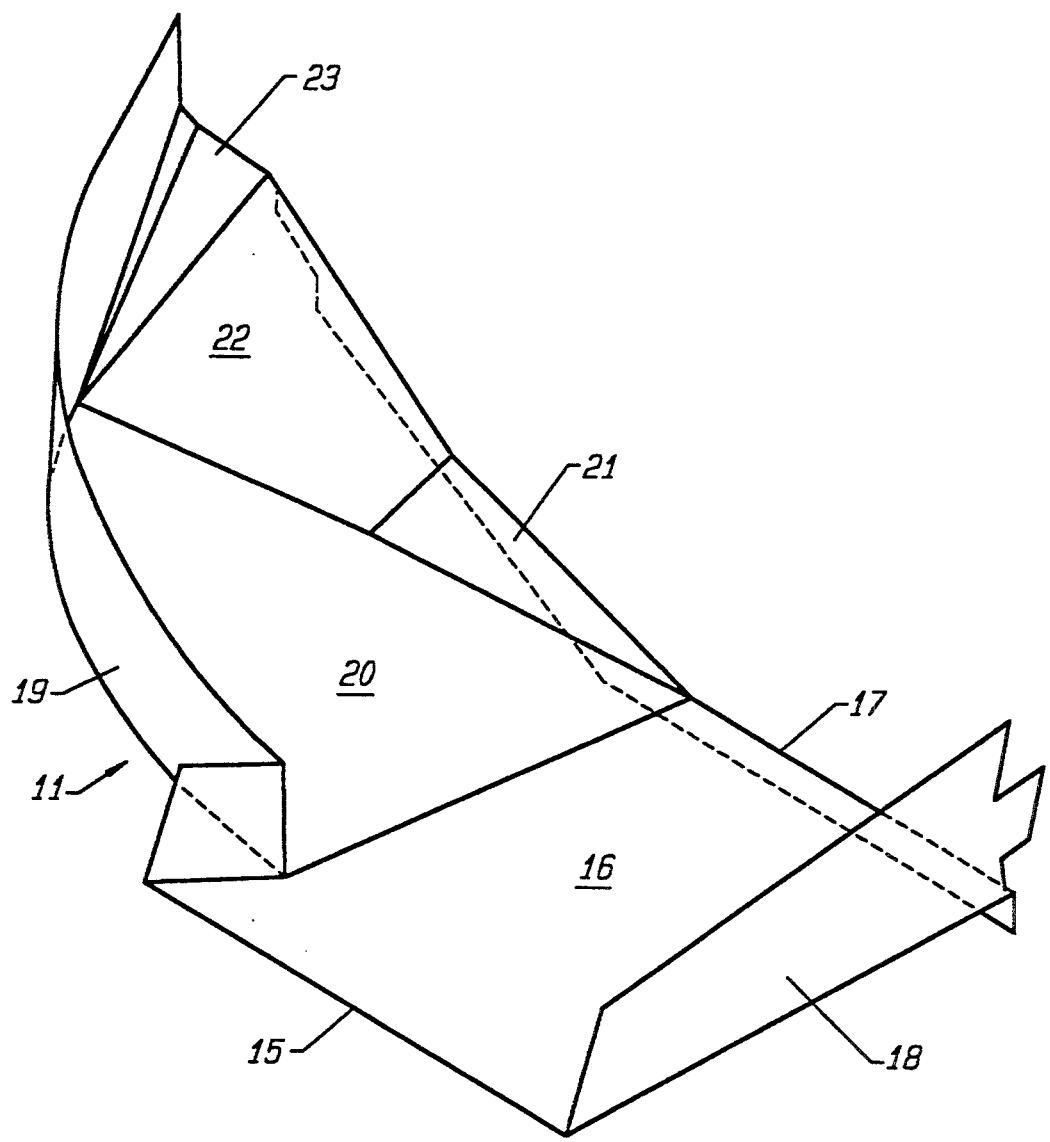
FIG. 8 is a perspective enlarged view of the holding bin.

Referring to FIGS. 7 and 8 in particular, bin 11 is formed with a funnel-shaped bottom surface having an upper leading edge 15 through which fruit is deposited into the bin. The bin is sloped downwardly such that the fruit slides downward on a slide plate 16 toward a discharge end 17. It has been found that a slope of between 20° to 25° is sufficient to produce a rapid movement of fruit without piling up fruit pieces along the discharge edge. Bin 11 further provides side walls 18 and 19 for retaining the fruit pieces in the bin and a secondary storage area comprised of panel sections 20, 21 and 22 which tend to feed supported fruit in the direction of discharge edge 17. It will be noted, FIGS. 1–4 and 6, that sensor 13 is located generally above and in spaced relation to panel section 20, allowing fruit to pass between the sensor and bin 11.

Bin 11 also includes a "knockoff" section 23, which assures the return of fruit to the bin in the event one piece of fruit becomes stacked on another in a single fruit receptacle.

Fruit is picked up at the discharge end 17 of bin 11 by a flight conveyor means 24, which is of conventional design and may be of a type used in connection with "wet" feed systems, as shown and generally described in U.S. Pat. No. 3,704,041. Conveyor 24 essentially comprises a support plate 25 having a horizontal section for receiving fruit fed over the discharge edge 17 and an inclined section that extends upward relative to the discharge edge. A feed chain 26 having a plurality of lugs 27 secured thereto in spaced relation to each other receive single pieces of fruit therebetween. Thus, the support plate and lugs define a plurality of fruit receptacles and, as the chain with its lugs moves, the fruit is carried along the support plate and deposited onto a star wheel 28 for further processing.

Figure 2:
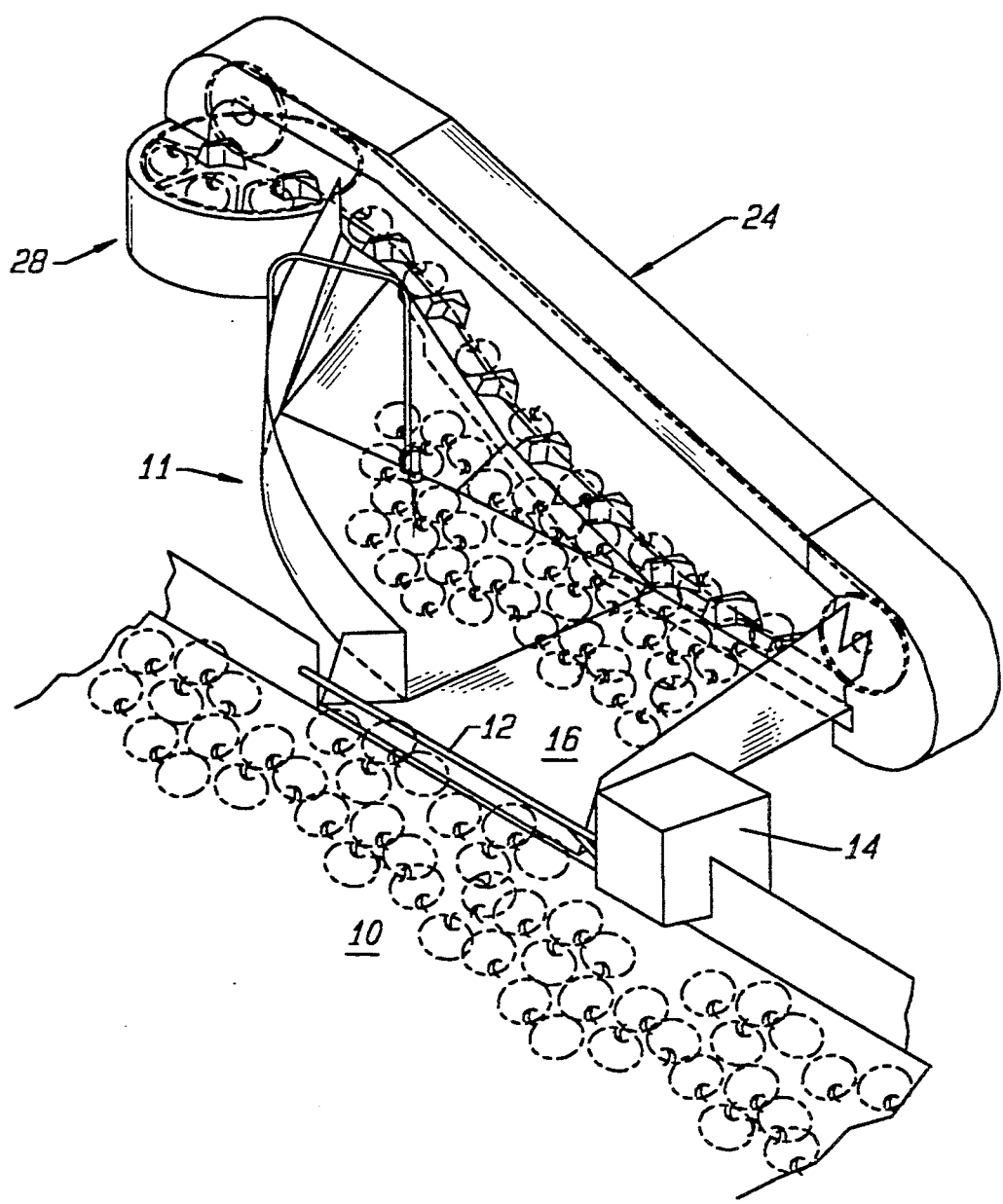
FIGS. 2, 3 and 4 are also perspective views of the preferred embodiment illustrating different conditions of operation.

The apparatus operates in the following manner:

Referring to FIG. 2, the apparatus is shown with fruit within bin 11 in a sufficient quantity that the sensor 13 can detect fruit within section 20 of bin 11. Under this condition, the operating means 14 which is responsive to sensor 13 maintains gate 12 to one side of conveyor 10 and no fruit is diverted from belt 10 into bin 11.

Figure 3:
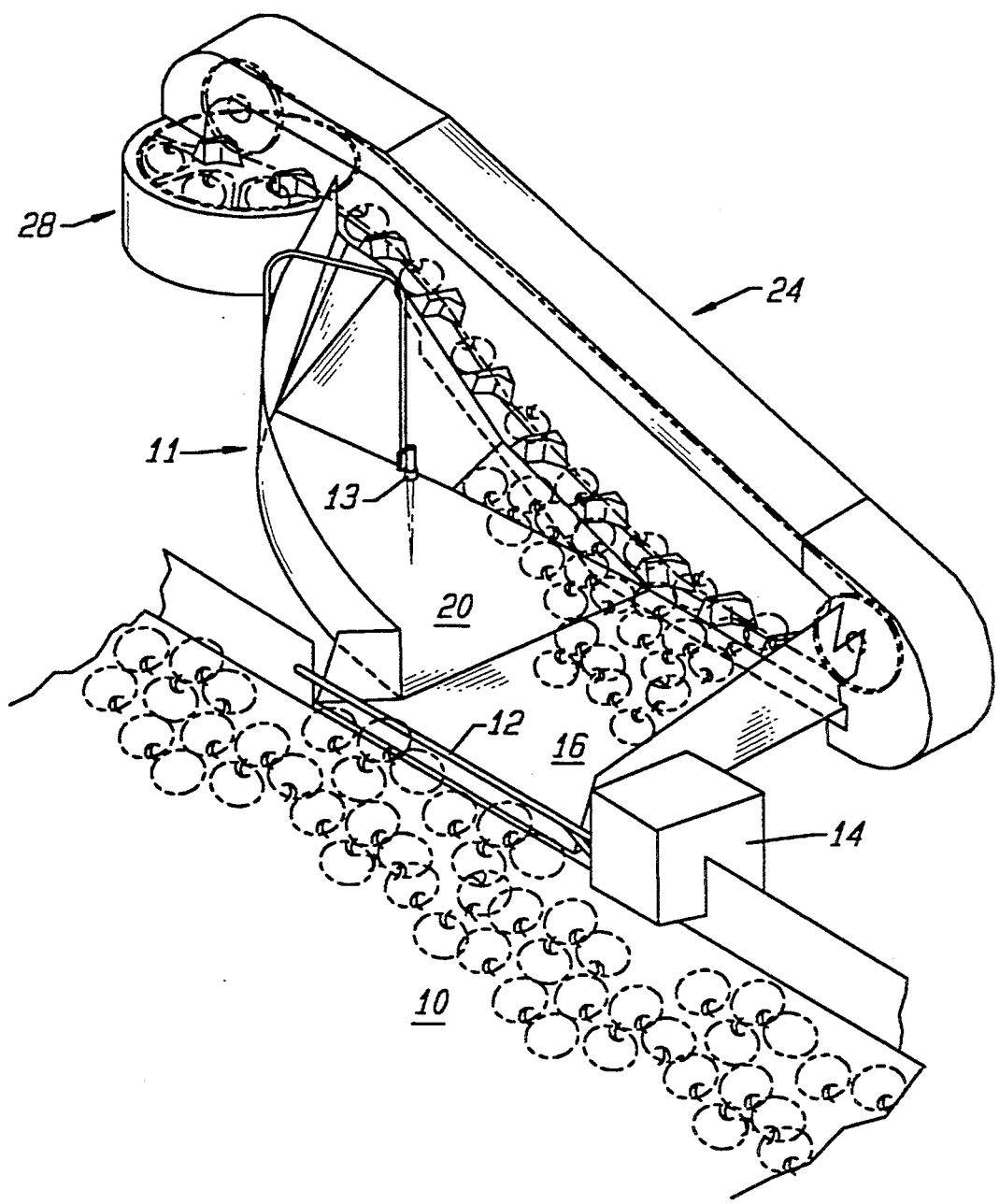
Figure 4:
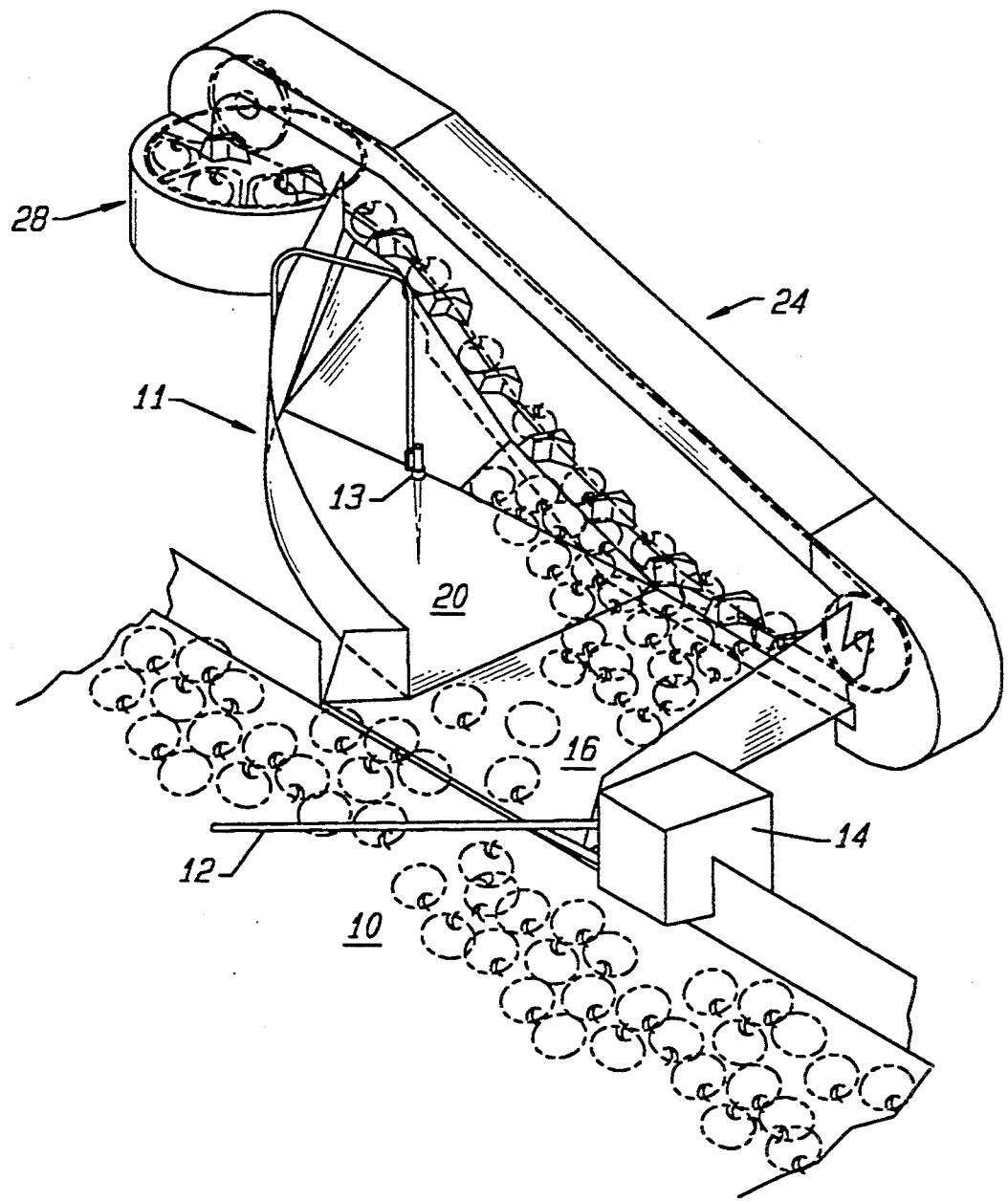
Figure 5:
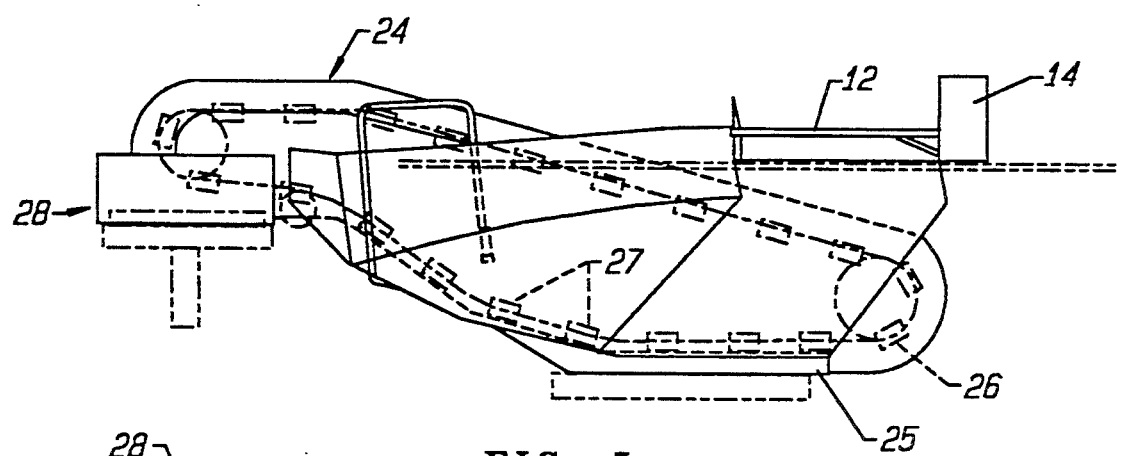
FIG. 5 is a side view of the apparatus.
Figure 6:
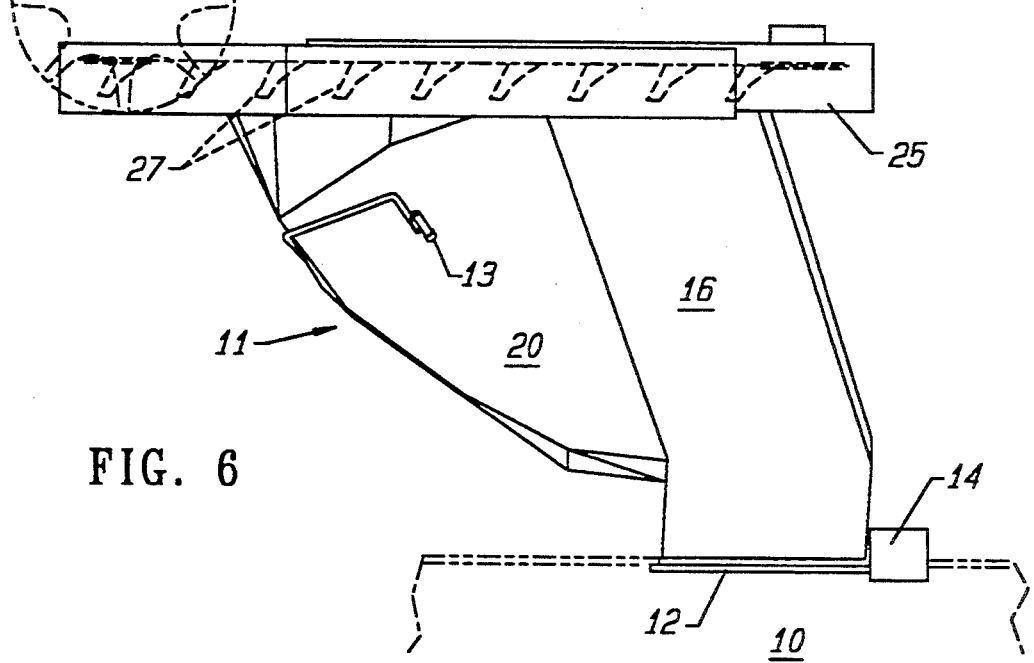
FIG. 6 is a plan view of the apparatus.

Referring to FIG. 3, a condition of the apparatus is shown where the sensor is unable to detect apples in section 19 of the bin. This triggers an opening of the gate (which, however, as shown has not yet occurred).

FIG. 4 illustrates the apparatus and the diversion of apples from conveyor 10 into bin 11. Apples which have been conveyed past gate 12 and, therefore, cannot be diverted are conveyed on either back to a bulk storage or in a continuous cycle as may be provided by various types of belt and rotary conveyors.

Although a preferred embodiment of the invention has been illustrated and described, various modifications and changes may be resorted to without departing from the spirit of the invention or the scope of the appended claims, and each of such changes is contemplated.

What is claimed is:

1. An apparatus for segregating and feeding fruit onto a conveyor and comprising:
    first conveyor means for moving the fruit from a bulk supply;
    a diverter gate movable from a position to one side of said first conveyor means to a fruit intercept position;
    a holding bin having a funnel-shaped bottom surface, positioned to said one side of said conveyor means for receiving fruit diverted from said first conveyor means, the bottom surface of said bin extending downward from a level below a supporting surface of said first conveyor means to a lower discharge edge;

a second conveyor having a plurality of fruit receptacles equally spaced apart a sufficient distance to receive a single piece of the fruit from said bin along said discharge edge;

a sensor positioned for detecting an approximate quantity of the fruit within said bin; and means responsive to said sensor for operating said diverter gate to intercept the fruit from said first conveyor means when said bin is near to empty.

2. The apparatus of claim 1, the bottom surface of said holding bin being sloped to direct descent of the fruit received from said first conveyor means toward the lower discharge edge.

3. The apparatus of claim 1, the bottom surface of said holding bin extending downward and away from said first conveyor means at an angle of approximately 20° to 25°.

4. The apparatus of claim 1, said first conveyor means comprising a rotary table for receiving the fruit from the bulk supply.

5. The apparatus of claim 1, said second conveyor means comprising a support plate having a horizontal section for receiving the fruit fed over the discharge edge of said bin and an inclined section that extends upward relative to the discharge edge, and a feed chain having a plurality of lugs secured thereto in spaced relation to receive single pieces of the fruit therebetween, said support plate and lugs defining a plurality of fruit receptacles.

6. The apparatus of claim 1, said holding bin having a wall section that extends upward from said discharge edge for dislodging any more than one piece of fruit carried in a single fruit receptacle of said second conveyor means.

7. The apparatus of claim 1, said holding bin having a secondary storage area for retaining the fruit on an incline, said sensor being positioned to detect a presence or absence of fruit in said storage area.

8. The apparatus of claim 1, and means formed on said holding bin for "knocking" off any fruit more than one carried in a single fruit receptacle.

* * * * *